March 3, 1936.　　　　L. W. RICH　　　　2,032,952
ENGINE
Filed July 27, 1932
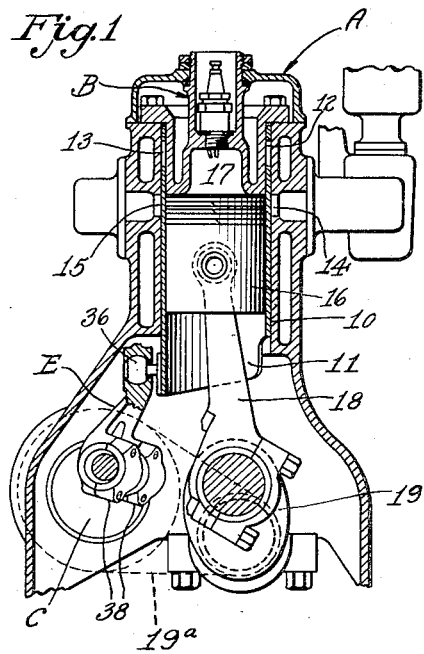
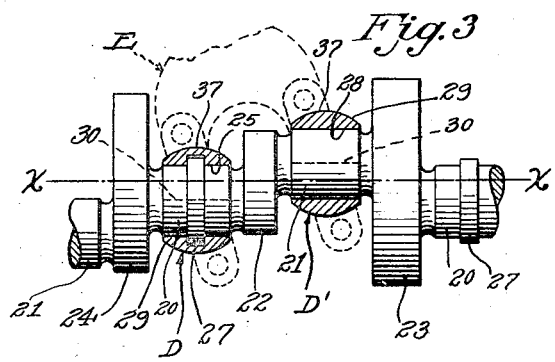
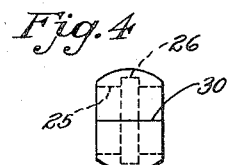
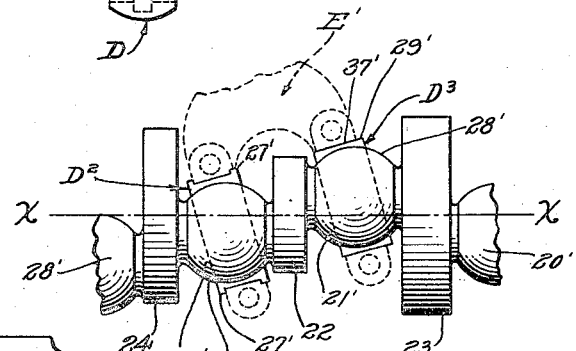
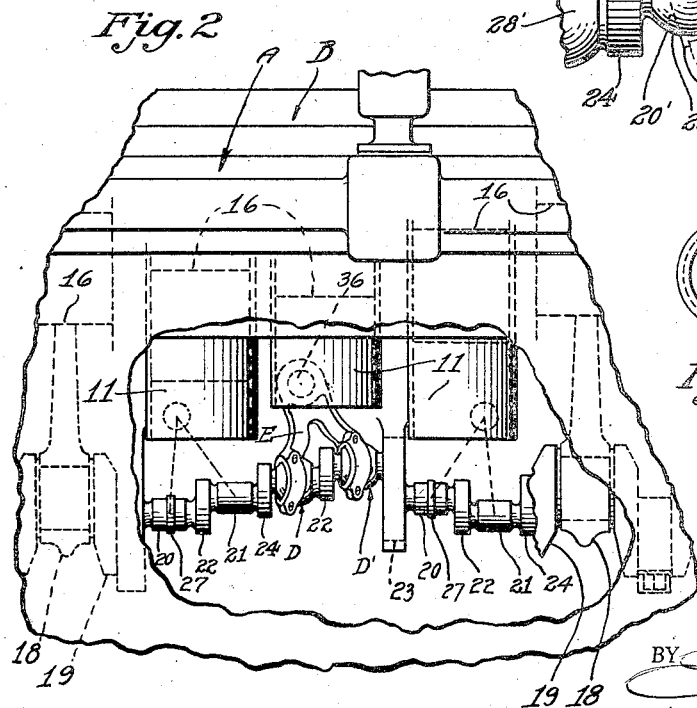
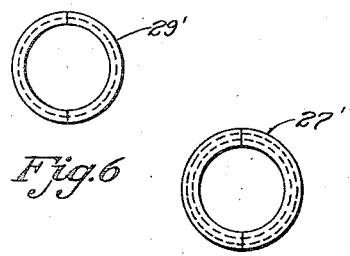
INVENTOR.
Lloyd W. Rich
BY
ATTORNEY.

Patented Mar. 3, 1936

2,032,952

UNITED STATES PATENT OFFICE 2,032,952

ENGINE

Lloyd W. Rich, Detroit, Mich., assignor to Continental Motors Corporation, Detroit, Mich., a corporation of Virginia Application July 27, 1932, Serial No. 625,004

18 Claims. (Cl. 74—23)

This invention relates primarily to engines and refers more particularly to an improved mechanism for operating a sleeve of a sleeve valve internal combustion engine. My invention also relates to improvements in wobble cranks whereby rotary motion of the wobble shaft is converted into combined reciprocation and oscillation of the driven member, the latter in the illustrated embodiment being an engine sleeve valve.

It is an object of my invention to provide a simplified and improved wobble shaft. It has been generally customary in the past to machine a wobble crank by turning the shaft on an axis through the wobble crank, but this leads to considerable difficulties rendering such practices commercially impractical especially in connection with multi-crank valveshafts since the whole shaft must be turned successively about the axes of the respective wobble cranks. Such axes do not ordinarily lie within the end faces of the valveshaft rendering such method inaccurate, expensive, and impractical.

It is a further object of my invention to provide an improved wobble shaft having crank portions whose axes are disposed substantially parallel with the shaft axis whereby the aforesaid difficulties are overcome, the crank portions being provided with bearing members adapted to compensate for any slight inaccuracies arising from misalignment of the crank portions and the mechanism driven thereby.

Difficulty has been experienced in connection with wobble cranks of the type having crank portions for actuating the forked ends of a sleeve driving link, owing to a binding action arising between the crank portions and link. Unless the axes and centers of the crank portions are exactly aligned with the associated axes and centers of the link openings, the aforesaid binding action will result, giving rise to objectionable friction, wear, and inefficiency of power transmission.

It is a further object of my invention to provide an improved wobble driving mechanism having driving ball portions and engaged socket portions, wherein the ball portions or socket portions may be machined to greater advantage separately from the members, such as a shaft or link, which carry the ball or socket portions.

Further objects and advantages of my invention will be apparent as this specification progresses, reference being had to the accompanying drawing in which, Fig. 1 is a sectional elevational view through a typical cylinder of a multi-cylinder engine incorporating my improvements.

Fig. 2 is a fragmentary side elevational view of the engine with a portion of the crankcase broken away so as to illustrate my wobble shaft.

Fig. 3 is a detail view of a typical wobble crank of the wobble shaft.

Fig. 4 is a side elevational view of the bearing member shown in Fig. 3.

Fig. 5 is a view corresponding to Fig. 3 but showing a modified form of my invention.

Fig. 6 is a side elevational view of the bearing member shown on the left crank portion of Fig. 5, and Fig. 7 is a side elevational view of the bearing member shown on the right crank portion of Fig. 5.

In the drawing the engine A is illustrated as the "Burt-McCollum" single sleeve valve type, the typical cylinder 10 thereof containing the sleeve valve 11 having suitable ports 12, 13 for cooperation in the well known manner with the intake and exhaust ports 14, 15 respectively. A cylinder head structure B closes the outer end of the cylinder, forming with piston 16, the combustion chamber 17. The piston 16 actuates connecting rod 18 and crankshaft 19, all of which parts are well known and may be of any suitable form and construction.

For driving the various sleeve valves 11, I have provided a wobble valveshaft C adapted to be driven by suitable drive 19a in the usual manner from crankshaft 19 at half speed for the four stroke cycle engine illustrated.

The valveshaft C has a plurality of longitudinally spaced wobble cranks respectively associated with each sleeve and the description will, for the most part, be limited to one of these wobble cranks as shown in Fig. 3 or Fig. 5, it being understood that they are all similarly constructed.

Referring to Fig. 3, each wobble crank is formed with a pair of crank portions 20, 21 having their longitudinal axes disposed parallel with the longitudinal axis X—X of valveshaft C, these crank portions in Fig. 3 having generally cylindrical surfaces. The crank portions 20, 21 are suitably joined by shaft portion 22 and the wobble shaft C has suitable spaced bearings 23. Adjacent wobble cranks are also suitably connected either by a bearing 23 or by a shaft portion 24.

Mounted on crank portions 20, 21 are bearing members D and D¹ respectively, one of the bearing members being fixed against movement longitudinally of its crank portion and the other being slightly longitudinally movable to compensate for any misalignment in the assembly. Thus bearing member D has a cylindrical bore 25 engaging crank portion 20, the bore having an annular recess 26 within which an annular flange 27 of crank portion 20 projects, thereby fixing member D against longitudinal movement. Bearing member D¹ has a cylindrical bore 28 slidable longitudinally on crank portion 21 whereby to permit a slight shifting to relieve any binding tendencies in the assembly. The members D, D¹, in Fig. 3 have outer surfaces 29 as portions of spheres whereby the wobble crank is provided with actuating ball portions. The bearing members D, D¹ are preferably longitudinally split as indicated at 30 whereby they may be readily assembled.

The sleeve driving wobble yoke link E comprises a three point connecting drive between wobble shaft C and sleeve valve 11. The upper single point is in the form of a ball and socket joint 36 and the two spaced points are in the form of bearing openings 37 respectively shaped to receive bearing surfaces 29. Removable caps 38, shown in Fig. 1, permit assembly of the forked end of link E on the ball portions 29.

The offset crank portions 20, 21 are preferably relatively angularly spaced, as shown in Fig. 1, as well as being relatively longitudinally spaced.

As the wobble shaft is rotated, crank portions 20, 21 will rotate with bearing members D, D¹. The link E will be moved with a wobble movement imparting the desired combined reciprocation and oscillation to the sleeve 11, surfaces 29 having a sliding bearing in the socket openings 37 of the forked link E. In assembling the mechanism, should the centers of the sockets 37 not be exactly coincident with the centers of the associated crank portions, then bearing D¹ will shift longitudinally to compensate for any such inaccuracy. If the crank portions 20, 21 were formed with the bearing members D, D¹ as an integral part thereof, it will be apparent that extreme precision would have to be used in machining the mechanism so as to hold the centers of the valveshaft ball portions spaced exactly to correspond with the centers of the spaced sockets of the link E. With my invention the manufacture is greatly facilitated, cheapened, and speeded and at the same time binding tendencies and excessive wear in the driving mechanism prevented.

Referring to the modification in Figs. 5 to 7, I have illustrated a wobble shaft having integral ball portions having their axes disposed parallel with shaft axis X—X, and at the same time I have provided means for compensating for any binding tendency of the character aforesaid. Many parts previously described in connection with Fig. 3 are duplicated in Fig. 5 as indicated by similar reference characters.

In Fig. 5 the ball crank portions 20¹, 21¹ receive bearing members D², D³ having inner spherical surfaces slidable on the ball surfaces 28¹ and having outer cylindrical surfaces 29¹ adapted to receive the cylindrical openings 37¹ of the forked end of link E¹. One of the bearing members, such as D², has annular flanges 27¹ receiving the associated fork of link E¹ whereby relative longitudinal movement is prevented between link E and member D². The other member D³ is free from flanges so that during assembly the opening 37¹ may slide longitudinally on surface 29¹ in finding the true centers without binding. After assembly the caps 38 in Fig. 5 are preferably adapted to clamp bearing members D², D³ against any relative movement, all movement taking place between the ball and socket surfaces. By reason of my invention, the link E¹ may be fitted to the ball portions with the centers of the ball portions and sockets readily coinciding without any binding tendency. The center spacing for the crank ball portions and for the link socket portions do not have to be accurately matched and held with difficult precision.

If desired, both of the link forks may have the disclosed compensating feature associated therewith instead of only one as illustrated in Fig. 5 for example. Various changes and modifications will be apparent from my disclosure and it is not my intention to limit my invention to the specific forms shown.

What I claim as my invention is:

1. A wobble shaft for driving a forked sleeve valve link, said shaft having a pair of link actuating crank portions, said forked link having openings surrounding said crank portions, bearing means between said openings and said crank portions, and means for compensating for a binding tendency between said link and shaft.

2. A wobble shaft for driving a forked sleeve valve link, said shaft having a pair of link actuating crank portions, said forked link having openings surrounding said crank portions, bearing means between said openings and said crank portions, and means for compensating for a binding tendency between said link and shaft, said crank portions having their longitudinal axes disposed substantially parallel with the axis of said shaft.

3. A wobble shaft for driving a forked sleeve valve link, said shaft having a pair of link actuating crank portions, said forked link having openings surrounding said crank portions, bearing means between said openings and said crank portions, and means for compensating for a binding tendency between said link and shaft, said crank portions having their longitudinal axes disposed substantially parallel with the axis of said shaft, said crank portions being adapted to actuate said link with combined reciprocation and oscillation.

4. A driving mechanism for an engine sleeve valve including, a shaft driven by the engine, said shaft having a pair of crank portions together providing a wobble crank, a sleeve connecting link having a forked portion with spaced openings respectively receiving said crank portions whereby to impart combined reciprocation and oscillation to said sleeve valve, and means associated with said link and crank portions adapted to compensate for misalignment of said openings with said crank portions.

5. A driving mechanism for an engine sleeve valve including, a shaft driven by the engine, said shaft having a pair of crank portions together providing a wobble crank, a sleeve connecting link having a forked portion with spaced openings respectively receiving said crank portions whereby to impart combined reciprocation and oscillation to said sleeve valve, and means slidable longitudinally of said shaft intermediate said link and wobble crank for aligning said link and wobble crank against a binding tendency.

6. In a driving mechanism for an engine sleeve valve having a three point sleeve driving member adapted to actuate the sleeve with combined reciprocation and oscillation, said mechanism comprising a shaft member having an offset wobble crank, and means between said members adapted for limited sliding relative to one of said members whereby to align said members.

7. In a driving mechanism for engine sleeve valves, a shaft member having a pair of actuating portions together forming a crank, a sleeve actuating member having spaced openings respectively receiving the actuating portions of said crank, and a bearing device intermediate one of said openings and crank portions, said bearing device being slidably associated with one of said members to relieve binding connection with the other of said members.

8. In a driving mechanism for engine sleeve valves, a shaft member having a pair of actuating portions together forming a crank, a sleeve actuating member having spaced openings respectively receiving the actuating portions of said crank, and bearing means intermediate said openings and crank portions, said bearing means having cylindrical surface contact with one of said members and spherical surface contact with the other of said members.

9. In a driving mechanism for engine sleeve valves, a shaft member having a pair of actuating portions together forming a crank, a sleeve actuating member having spaced openings respectively receiving the actuating portions of said crank, and a bearing device between each of said openings and crank portions, said devices each having a spherical surface slidably engageable with one of said members.

10. A wobble mechanism of the character described including a driving shaft and a driven element, said shaft having a pair of crank forming portions relatively longitudinally and angularly offset, said driven element having spaced openings receiving said crank portions respectively, bearing means between said openings and crank portions, means for locating the bearing means associated with one of said crank portions whereby the associated opening of said driven element is centered with the last said crank portion, and means associated with the other of said crank portions and bearing means whereby the other of said openings is relieved of binding tendency resulting from an out of center relation between the last said opening and crank portion.

11. A wobble mechanism of the character described for imparting combined reciprocation and oscillation to a sleeve valve, including a driving shaft and a driven element, said shaft having a pair of longitudinally spaced cylindrical wobble crank portions having their longitudinal axes substantially parallel with the axis of said shaft, a pair of bearing members each having a cylindrical bore receiving said crank portions respectively, said bearing members having spherical outer surfaces slidably engageable with said driven element.

12. A wobble mechanism of the character described for imparting combined reciprocation and oscillation to a sleeve valve, including a driving shaft and a driven element, said shaft having a pair of longitudinally spaced cylindrical wobble crank portions having their longitudinal axes substantially parallel with the axis of said shaft, a pair of bearing members each having a cylindrical bore receiving said crank portions respectively, said bearing members having spherical outer surfaces slidably engageable with said driven element, said bearing members being split longitudinally of said shaft.

13. A wobble mechanism of the character described for imparting combined reciprocation and oscillation to a sleeve valve, including a driving shaft and a driven element, said shaft having a pair of longitudinally spaced cylindrical wobble crank portions having their longitudinal axes substantially parallel with the axis of said shaft, a pair of bearing members each having a cylindrical bore receiving said crank portions respectively, said bearing members having spherical outer surfaces slidably engageable with said driven element, said wobble crank portions being angularly spaced with respect to the axis of said shaft.

14. A wobble mechanism of the character described for imparting combined reciprocation and oscillation to a sleeve valve, including a driving shaft and a driven element, said shaft having a pair of longitudinally spaced wobble crank portions having their longitudinal axes substantially parallel with the axis of said shaft, a pair of bearing members each having a bore receiving said crank portions respectively, said bearing members having spherical outer surfaces slidably engageable with said driven element, means securing one of said bearing members against movement longitudinally of the crank portion associated therewith, and means permitting limited sliding of the other of said bearing members longitudinally of its associated crank portion.

15. A wobble drive mechanism for imparting combined oscillation and reciprocation to an engine sleeve valve, including a driving shaft and a driven element, said shaft having a pair of longitudinally spaced wobble crank ball portions having their longitudinal axes disposed substantially parallel with the axis of said shaft, a pair of bearing members each having a bore receiving said crank portions respectively, said bearing members having spherical inner surfaces slidably engageable with said ball portions respectively, and means securing said bearing portions with said driven element.

16. A wobble drive mechanism for imparting combined oscillation and reciprocation to an engine sleeve valve, including a driving shaft and a driven element, said shaft having a pair of longitudinally spaced wobble crank ball portions having their longitudinal axes disposed substantially parallel with the axis of said shaft, a pair of bearing members each having a bore receiving said crank portions respectively, said bearing members having spherical inner surfaces slidably engageable with said ball portions respectively, and means securing said bearing portions with said driven element, one of said bearing portions being adjustably associated with said driven element.

17. A wobble drive mechanism for imparting combined oscillation and reciprocation to an engine sleeve valve, including a driving shaft and a driven element, said shaft having a pair of longitudinally spaced wobble crank ball portions having their longitudinal axes disposed substantially parallel with the axis of said shaft, a pair of bearing members each having a bore receiving said crank portions respectively, said bearing members having spherical inner surfaces slidably engageable with said ball portions respectively, and means securing said bearing portions with said driven element, said bearing members being split longitudinally of said shaft.

18. A wobble drive mechanism for imparting combined oscillation and reciprocation to an engine sleeve valve, including a driving shaft and a driven element, said shaft having a pair of longitudinally spaced wobble crank ball portions having their longitudinal axes disposed substantially parallel with the axis of said shaft, a pair of bearing members each having a bore receiving said crank portions respectively, said bearing members having spherical inner surfaces slidably engageable with said ball portions respectively, and means securing said bearing portions with said driven element, said wobble crank ball portions being angularly spaced with respect to the axis of said shaft.

LLOYD W. RICH.